United States Patent
Novak et al.

(10) Patent No.: US 7,699,986 B2
(45) Date of Patent: Apr. 20, 2010

(54) METHOD FOR ACTIVATED SLUDGE WASTEWATER TREATMENT WITH HIGH DISSOLVED OXYGEN LEVELS

(75) Inventors: Richard A. Novak, Naperville, IL (US); Malcolm Fabiyi, LaGrange Park, IL (US); Amitabh Gupta, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 12/117,791

(22) Filed: May 9, 2008

(65) Prior Publication Data
US 2009/0050562 A1 Feb. 26, 2009

Related U.S. Application Data

(60) Provisional application No. 60/966,038, filed on Aug. 24, 2007.

(51) Int. Cl.
*C02F 3/00* (2006.01)
(52) U.S. Cl. .................. 210/620; 210/621; 210/623; 210/624; 210/626; 210/628
(58) Field of Classification Search .................. 210/620, 210/621, 623–628
See application file for complete search history.

(56) References Cited

U.S. PATENT DOCUMENTS

| | | | |
|---|---|---|---|
| 3,043,433 | A | 7/1962 | Singer |
| 3,092,678 | A | 6/1963 | Braun |
| 3,206,176 | A | 9/1965 | Peterson |
| 3,210,053 | A | 10/1965 | Boester |
| 3,439,807 | A | 4/1969 | Danjes |
| 3,452,966 | A | 7/1969 | Smolski |

(Continued)

FOREIGN PATENT DOCUMENTS

DE 29 22 828 A1 12/1980

(Continued)

OTHER PUBLICATIONS

Abbassi, B. et al., "Minimization of Excess Sludge Production by Increase of Oxygen Concentration in Activated Sludge Flocs; Experimental and Theoretical Approach", Water Research vol. 34, No. 1, pp. 139-146 (1999).

(Continued)

*Primary Examiner*—Chester T Barry
(74) *Attorney, Agent, or Firm*—Robert J. Hampsch

(57) ABSTRACT

An activated sludge wastewater treatment method is provided. The disclosed method includes: receiving a stream of wastewater into a mixed liquor in an uncovered activated sludge basin; introducing high purity oxygen to the mixed liquor in the activated sludge basin to produce euoxic conditions (i.e. a dissolved oxygen level in the range of between about 5 mg to 15 mg) in the activated sludge basin; passing a portion of the mixed liquor in the activated sludge basin through a clarifier to separate activated sludge and produce an effluent stream and an activated sludge stream; and recycling a portion of the activated sludge stream to the activated sludge basin to produce a mixed liquor having a solids loading of between about 3000 mg and about 10000 mg of suspended solids per liter of mixed liquor and a solids retention time of between about 7 days and 40 days.

23 Claims, 7 Drawing Sheets

U.S. PATENT DOCUMENTS

| | | |
|---|---|---|
| 3,666,103 A | 5/1972 | Green |
| 3,827,679 A | 8/1974 | Kaelin |
| 3,865,721 A | 2/1975 | Kaelin |
| 3,933,640 A | 1/1976 | Kirk et al. |
| RE29,782 E * | 9/1978 | McWhirter ............... 210/604 |
| 4,136,023 A | 1/1979 | Kirk et al. |
| 4,163,712 A | 8/1979 | Smith |
| 4,192,740 A | 3/1980 | Savard et al. |
| 4,206,047 A | 6/1980 | Mandt |
| 4,256,839 A | 3/1981 | Solomons et al. |
| 4,263,143 A | 4/1981 | Ebner et al. |
| 4,269,714 A | 5/1981 | Ishikawa et al. |
| 4,430,224 A | 2/1984 | Fuchs |
| 4,454,077 A | 6/1984 | Litz |
| 4,455,232 A | 6/1984 | Reid |
| 4,898,672 A | 2/1990 | Clifft et al. |
| 4,919,849 A | 4/1990 | Litz et al. |
| 5,332,502 A * | 7/1994 | Wickens et al. ............ 210/605 |
| 5,348,655 A | 9/1994 | Simas et al. |
| 5,451,348 A | 9/1995 | Kingsley |
| 5,463,176 A | 10/1995 | Eckert |
| 5,545,326 A | 8/1996 | Petering |
| 5,874,003 A | 2/1999 | Rose |
| 5,916,491 A | 6/1999 | Hills |
| 5,925,290 A | 7/1999 | Hills |
| 6,086,766 A | 7/2000 | Yasui |
| 6,123,446 A | 9/2000 | Schuchardt |
| 6,135,430 A | 10/2000 | Bergman, Jr. et al. |
| 6,145,815 A | 11/2000 | Cheng et al. |
| 6,245,237 B1 | 6/2001 | Blough et al. |
| 6,270,061 B1 | 8/2001 | Bouquet et al. |
| 6,280,624 B1 | 8/2001 | Hermans et al. |
| 6,426,004 B1 | 7/2002 | Hiatt et al. |
| 6,461,500 B1 | 10/2002 | Hoage et al. |
| 6,464,384 B2 | 10/2002 | Kubera et al. |
| 6,488,854 B2 | 12/2002 | O'Leary et al. |
| 6,555,002 B2 | 4/2003 | Garcia et al. |
| 6,596,171 B2 | 7/2003 | Unger |
| 6,605,220 B2 | 8/2003 | Garcia et al. |
| 6,668,556 B2 | 12/2003 | Speece |
| 6,761,797 B2 | 7/2004 | Kohigruber et al. |
| 6,780,319 B1 * | 8/2004 | Thieblin et al. ............ 210/627 |
| 6,783,671 B2 | 8/2004 | Unger |
| 6,863,817 B2 | 3/2005 | Liu et al. |
| 7,005,069 B2 | 2/2006 | Shell |
| 7,105,092 B2 | 9/2006 | Chiba |
| 7,163,632 B1 | 1/2007 | Speece |
| 7,329,351 B2 | 2/2008 | Roberts et al. |
| 7,413,656 B2 | 8/2008 | Allen et al. |
| 2004/0004038 A1 | 1/2004 | Yamaguchi et al. |
| 2004/0007523 A1 | 1/2004 | Gabon et al. |

FOREIGN PATENT DOCUMENTS

| | | |
|---|---|---|
| EP | 0 611 728 A1 | 8/1994 |
| EP | 0 645 347 A1 | 3/1995 |
| EP | 1 005 898 A1 | 6/2000 |
| JP | 1258732 | 10/1989 |
| JP | 8132100 A | 5/1996 |
| JP | 9150182 A | 6/1997 |

OTHER PUBLICATIONS

Abson, J.W. et al., "The Activated-Sludge Process as a High-Rate Sewage-Treatment System", Water Pollution Control, vol. 68, 1969, No. 5, pp. 574-583.

Aggarwal, a. et al., "Optimal Design of Single and Multiple Stage Activated Sludge Processes," Water, Air and Soil Pollution 42, p. 67-85 (1988).

Equipment Spec, "The Vitox System", BOC Gases, The BOD Group 1998.

Marston, K.R., et al., "Five-Day Biochemical Oxygen Demand Removal From Rendering Plant Wastewater", Proceedings of the 37$^{th}$ Industrial Waste Conference May 11, 12 and 13, 1982, Purdue University, West Lafayette, Indiana.

McWhirter, et al., "The Use of High-Purity Oxygen in the Activated Sludge Process", vols. 1, Chapters 1-3, CRC Press, West Palm Beach, Florida (1978).

Moran, et al., "High Purity Oxygen Biological Nutrient Removal (BNR)", WEFTEC 2000, Water Environmental Federation. (2000 ).

Perez-Elvira, et al., "Sludge minimization technologies," Reviews in Environmental Science and Bio/Technology (2006) 5:375-398.

Roxburgh, et al., "Sludge Minimization Technologies- Doing More to Get Less", WEFTEC (2006), pp. 506-525, Water Environment Foundation.

"Status of Oxygen-Activated Sludge Wastewater Treatment" EPA 625 4-77-003a., Chapter 1, pp. 1-46, U.S. Environmental Protection Agency. (no date provided).

Thomas, et al., "The OXY-DEP VSA system—an exciting new approach to aeration for waste water treatment", Knowledge Paper, Air Products and Chemicals, Inc. website (2003).

"Wastewater Technologies, two oxygenation aeration options—both proven superior, simple and compact", pp. 1-5, Air Liquide Industrial U.S. LP [www.us.airliquide.com]. (no date provided).

Wei, et al., "Minimization of Excess Sludge Production for Biological Wastewater Treatment", Water Research 37, pp. 4453-4467, (2003).

Yoon, et al., "The optimum operational condition of membrane bioreactor (MBR): cost estimation of aeration and sludge treatment", Water Research 38, pp. 37-46 (2004).

* cited by examiner

| Activated Sludge Process | SRT (days) | F:M Ratio (BOD/MLVSS) | DO (mg/L) | Vol. Load (BOD/d/10³ft³) | MLSS (mg/L) | HRT (hours) | Recycle Ratio |
|---|---|---|---|---|---|---|---|
| Conventional | 5-15 | 0.2-0.4 | 1-3 | 20-40 | 1500-3000 | 4-8 | 0.25-0.75 |
| Complete Mix | 5-15 | 0.2-0.6 | 1-3 | 50-120 | 2500-4000 | 3-5 | 0.25-1.0 |
| Extended Aeration | 20-30 | 0.05-0.15 | 1-3 | 10-25 | 3000-6000 | 18-36 | 0.5-1.5 |
| High Rate Aeration | 5-10 | 0.4-1.5 | 1-3 | 100-1000 | 4000-10000 | 2-4 | 1.0-5.0 |
| Covered Basin-HPO | 3-10 | 0.25-1.0 | 2-20 | 100-200 | 2000-5000 | 1-3 | 0.25-0.5 |
| Oxidation Ditch | 10-30 | 0.05-0.30 | 1-3 | 5-30 | 3000-6000 | 8-36 | 0.75-1.50 |

FIG. 1

METHOD FOR ACTIVATED SLUDGE WASTEWATER TREATMENT WITH HIGH DISSOLVED OXYGEN LEVELS

CROSS REFERENCE TO RELATED APPLICATIONS

This application claims priority to U.S. Provisional Patent Application Ser. No. 60/966,038 filed Aug. 24, 2007, which is incorporated in its entirety by reference herein.

FIELD OF THE INVENTION

The present invention relates to methods and systems for wastewater treatment and more particularly, to the efficient operation of an activated sludge wastewater treatment system with high levels of dissolved oxygen.

BACKGROUND

Most conventional wastewater treatment plants use an activated sludge process to remove contaminants from the wastewater. Many different wastewater treatment schemes employing the activated sludge processes have been developed over the years with each of the different systems demonstrating different operating characteristics and different benefits. FIG. 1 is a table that depicts the operating characteristics of most types of wastewater treatment arrangements employing activated sludge process. Each of these wastewater treatment systems are summarized in the paragraphs that follow.

The activated sludge process is a biological wastewater treatment method in which carbonaceous organic matter of wastewater is consumed by microorganisms for life-sustaining processes (e.g. growth, reproduction, digestion, movement, etc.). The activated sludge process preferably occurs in an aerobic environment where oxygen is consumed during the utilization and degradation of organic materials and by-products of carbon dioxide and water are formed.

An activated sludge process is characterized by the suspension of micro-organisms in the wastewater, a mixture referred to as the mixed liquor. Activated sludge processes are designed based on the suspended solids within the mixed liquor (MLSS) and the organic loading of the wastewater, as represented by the biochemical oxygen demand (BOD) and/or chemical oxygen demand (COD). The MLSS represents the quantity of microorganisms involved in the treatment of the organic materials in the aeration basin, while the organic loading typically determines the requirements for the design of the aeration system.

The activated sludge process is preferably used as part of an overall wastewater treatment process or system, which includes a primary treatment of the wastewater for the removal of particulate solids prior to the use of activated sludge as a further treatment process to remove suspended and dissolved organic solids. A primary clarifier is typically used for such bulk separation After primary treatment of the influent to separate and remove particulate solids, the influent is then sent to an aeration basin or tank where the activated sludge process is initiated, as described in more detail herein. The solution or mixed liquor exiting the aeration basin is received by a secondary clarifier or settling tank, where flocs of microorganisms with their adsorbed organic materials settle out. This separation of sludge produces clear water or effluent which is often further treated to remove harmful bacteria and subsequently discharged. To control the biological process, a portion of the sludge that settle to the bottom of the secondary clarifier are returned to the activated sludge basin and a portion is disposed as part of a waste activated sludge stream for further treatment, for example to a aerobic digester or other solids handling process (thickening, dewatering, etc.).

In a conventional activated sludge process the primary effluent and acclimated micro-organisms (activated sludge or biomass) are aerated in a basin or tank. After a sufficient aeration period, the flocculent activated sludge solids are separated from the wastewater in a secondary clarifier. The clarified wastewater flows forward for further treatment or discharge. A portion of the clarifier underflow sludge is returned to the aeration basin for mixing with the primary-treated influent to the basin and the remaining sludge is wasted to the sludge handling portion of the treatment plant. Typically, the conventional activated sludge system operates at MLSS levels of 1500 to 3000 mg/L with a dissolved oxygen level at about 1 to 3 mg/L, a solids retention time of only 5 to 15 days, a hydraulic retention time of about 4 to 8 hours, a Food to Microorganism ratio of about 0.2 to 0.4, a Volumetric Loading of about 20 to 40 pounds BOD per day per 1000 cubic feet and a recycle ratio of between about 0.25 to 0.75

In the completely-mixed activated sludge process, influent wastewater and the recycled sludge are introduced uniformly through the aeration tank. This allows for uniform oxygen demand throughout the aeration tank and adds operational stability when treating shock loads. Aeration time ranges between 3 and 6 hours. Recirculation ratios in a completely-mixed system will range from 50 to 150 percent. The complete-mix activated sludge system operates at slightly higher MLSS levels than conventional systems, typically at 2500 to 4000 mg/L with similar dissolved oxygen level at about 1 to 3 mg/L and solids retention time of 5 to 15 days. Because of the enhanced treatment capabilities of the complete mix activated sludge process, it requires an aeration time or a Hydraulic Retention Time of only 3 to 5 hours. The typical Food to Microorganism ratio is about 0.2 to 0.6, a Volumetric Loading of about 50 to 120 BOD per day per 1000 cubic feet and a Recycle Ratio of between about 0.25 to 1.0

Extended aeration activated sludge plants are designed to provide a 24-hour aeration period for low organic loadings of less than 25 pounds biochemical oxygen demand per 1,000 cubic feet of aeration tank volume. This approach requires the use of very large basins which increases the aeration time and associated aeration power costs. Typically, the extended aeration activated sludge process operates at MLSS levels of 3000 to 6000 mg/L with a low dissolved oxygen level at about 1 to 3 mg/L, a high solids retention time of 20 to 30 days. The extended aeration process is also characterized by a very long hydraulic retention time of about 18 to 36 hours, a low Food to Microorganism ratio of about 0.05 to 0.15, a low Volumetric Loading of about 10 to 25 pounds of BOD per day per 1000 cubic feet and a Recycle Ratio of between about 0.5 to 1.50.

The closed-loop reactor, also known as an oxidation ditch, is a form of the extended aeration process. In an oxidation ditch process, the wastewater is propelled around a large area, oval racetrack-configured basin by mechanical aerator/mixing devices located at one or more points along the basin. These devices typically are either brush aerators, surface aerators or jet aerators. The velocity in the basin is designed to be between 0.8 and 1.2 feet per second. Much like the extended aeration process, the oxidation ditch process typically operates at MLSS levels of 3000 to 6000 mg/L with a low dissolved oxygen level at about 1 to 3 mg/L, a high solids retention time of between 10 and 30 days. The oxidation ditch process is also characterized by a very long hydraulic retention time of about 8 to 36 hours, a Food to Microorganism ratio of about 0.05 to 0.30, a low Volumetric Loading of about 5 to 30 pounds of BOD per day per 1000 cubic feet and a Recycle Ratio of about 0.75 to 1.50.

High rate aeration activated sludge process typically operates at higher MLSS levels of 4000 to 10000 mg/L but with a low dissolved oxygen level of about 1 to 3 mg/L, a more conventional solids retention time of 5 to 10 days. The high rate aeration process is also characterized by hydraulic retention time of only 2 to 4 hours, a high Food to Microorganism ratio of about 0.40 to 1.50, a high Volumetric Loading of about 100 to 1000 pounds of BOD per day per 1000 cubic feet and a high Recycle Ratio of between about 1.0 and 5.0.

The Covered Basin—High Purity Oxygen (HPO) activated sludge process is characterized as a system, such as a UNOX™ or OASES™ system, that employs a covered basin and direct injection of high purity oxygen in the mixed liquor within the covered basin to achieve higher dissolved oxygen rates of between about 2 to 20 mg/L. The covered basin systems typically operates at moderate MLSS levels of 2000 to 5000 mg/L and a very short solids retention time of 3 to 10 days. The Covered Basin-HPO process is also characterized by hydraulic retention time of only 1 to 3 hours, a Food to Microorganism ratio of about 0.25 to 1.00, a high Volumetric Loading of about 100 to 200 pounds of BOD/day per 1000 cubic feet and a Recycle Ratio of between about 0.25 to 0.50.

Many of the activated sludge processes, described above, produce large amounts of waste sludge that require further treatment and disposal. Treatment and disposal of excess sludge from wastewater treatment plants typically account for between about 25-65% of the total plant operation cost. The economic significance of this problem is increasing, due to more stringent regulations and rising disposal costs.

Existing methods for dealing with the removal of sludge include transporting the sludge to landfills, utilization of sludge for land application or agricultural purposes, and incineration of the sludge. In many regions, sludge disposal in landfills is being phased out and land application of sludge is becoming more strictly regulated to prevent environmental and health risks due to pathogens and toxic compounds in the sludge. Likewise, incineration of sludge is an expensive process and presents potential air pollution hazards. Due to the regulatory, environmental, and cost issues associated with solids handling and disposal, it is beneficial to minimize the amount of excess sludge produced in a wastewater treatment process.

Another major cost in the above-described wastewater treatment operations is electrical power. Current aeration systems used in wastewater treatment plants typically represent more than 50% of the overall plant power consumption. Power costs are increasing substantially due to rapidly rising electricity rates, and many electric power utilities have targeted wastewater treatment plants for possible electric power demand reductions.

Therefore, there is a significant need to reduce wastewater treatment plant operating costs through reduced solids handling and disposal costs together with power cost savings.

SUMMARY OF THE INVENTION

The present invention may also be characterized as a method of treating wastewater comprising the steps of: (i) receiving an influent stream of wastewater into a mixed liquor in an uncovered activated sludge basin; (ii) introducing oxygen to the mixed liquor in the activated sludge basin to produce euoxic conditions in the activated sludge basin; (iii) passing a portion of the mixed liquor in the activated sludge basin through a separator to separate activated sludge and produce an effluent stream and a activated sludge stream; and (iv) recycling a portion of the activated sludge stream to the activated sludge basin to produce a mixed liquor having a solids loading of between about 3000 mg and about 10000 mg of suspended solids per liter of mixed liquor or a solids retention time of greater than about 7 days or both.

In another aspect, the invention may be characterized as a method of enhancing wastewater treatment operations comprising the steps of introducing supplemental oxygen to an uncovered activated sludge basin to produce a dissolved oxygen level in the range of between about 5 mg to 15 mg of oxygen per liter of mixed liquor and recycling activated sludge to the activated sludge basin to produce a solids loading of between about 3000 mg and about 10000 mg of suspended solids per liter of mixed liquor or to maintain a solids retention time of between about 7 days to about 40 days.

BRIEF DESCRIPTION OF THE DRAWINGS

The above and other aspects, features, and advantages of the present invention will be more apparent from the following, more detailed description thereof, presented in conjunction with the following drawings, wherein:

FIG. 1 is a table that depicts the typical operating parameters of prior art activated sludge wastewater treatment systems;

DETAILED DESCRIPTION

Figure 2:
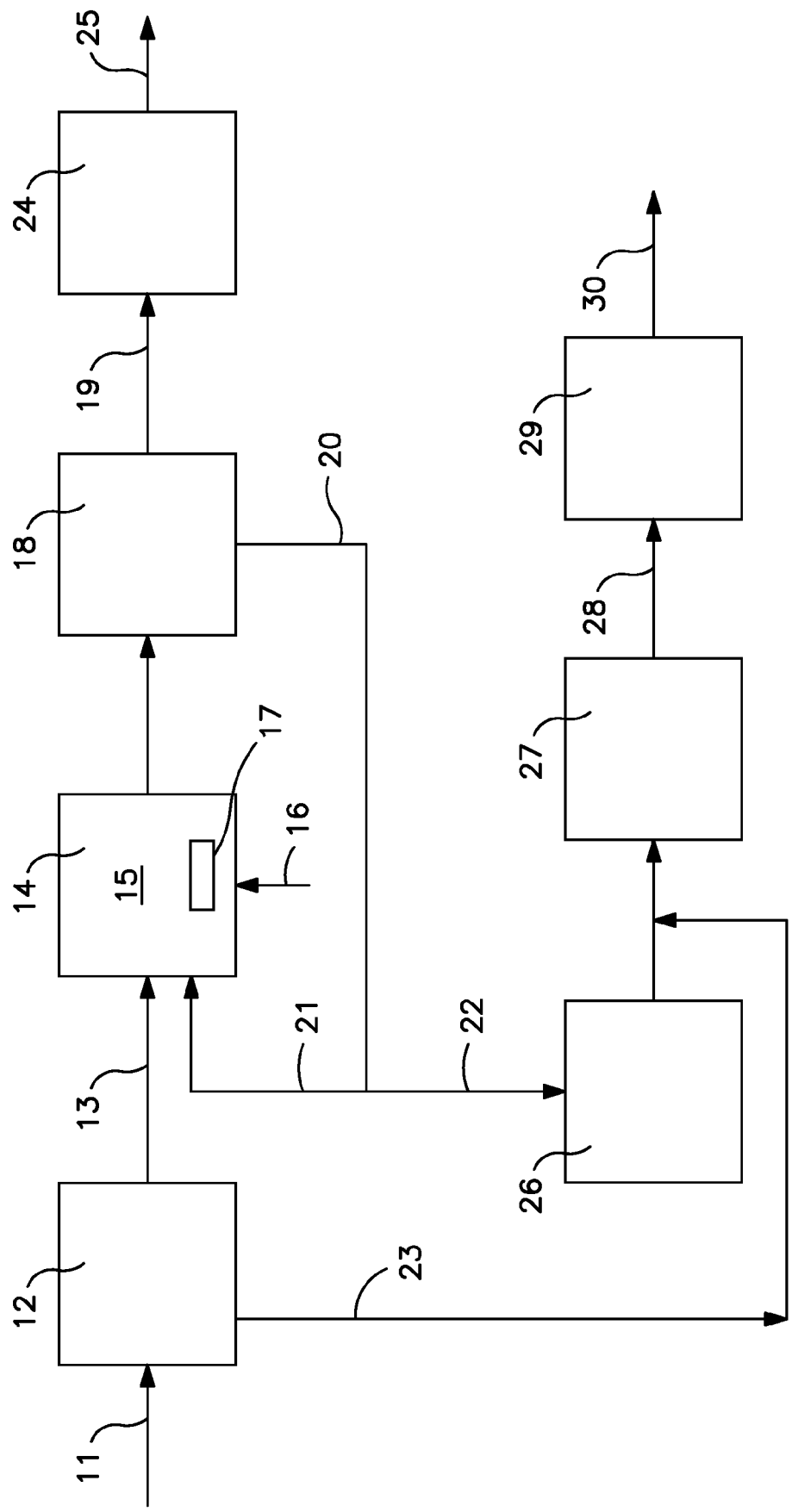
FIG. 2 is a schematic representation of an activated wastewater treatment system incorporating an embodiment of the present system and process.

Turning now to FIG. 2, there is shown a schematic block diagram of a wastewater treatment plant, incorporating the present embodiment of the activated sludge process. In primary treatment, stage, influent wastewater (11) is subjected to solid/liquid separation processes, such as gravity settling in a primary clarifier (12), to remove easily separated solids as primary sludge (23). The primary solids may be combined with waste activated sludge (22) for further treatment, or may be treated and disposed separately. The primary effluent (13) exiting the primary treatment stage, substantially free of particulate and easily settled solids, flows to the secondary treatment stage.

Secondary treatment stage comprises the activated sludge process and secondary separation. The activated sludge process occurs in an open or uncovered aeration basin (14) where biological activity consumes the contaminants in the mixed liquor (15). Generally, an open basin means aeration basins that are substantially open to gaseous exchange with the ambient atmosphere with or without an enclosing building. To provide the oxygen needed for respiration and metabolism of the biosolids, a source of oxygen gas (16) is added to the aeration basin, by suitable means such as a high purity oxygen aeration system (17). Any type of high purity oxygen contacting equipment and supply systems can be used although an I-SO contactor, available from Praxair Inc., is particularly well-suited for the present system and method. However, other types of high purity oxygen systems, including a Mixflo system or MVO contactor available from Praxair, Inc. may be used without departing from the scope of the present system and method for wastewater treatment. The present activated sludge process occurs in an open or uncovered basin, preferably with a cross-flow of oxygen that promotes removal of carbon dioxide, maintains the desired pH level in the aeration basin and maximizes oxygen transfer efficiency.

Secondary separation employs a secondary clarifier (18), where gravity settling is used to separate the biosolids or "activated sludge" (20) from the secondary effluent or treated water (19). Most of the settled solids (20) recovered in the secondary clarifier are returned to the aeration basin via the Return Activated Sludge line (21) to provide the biological activity needed for adequate treatment. A smaller portion of the separated solids, comprising the excess sludge growth in the basin, are removed via a Waste Activated Sludge (WAS) line (22) and sent to further handling and disposal operations. The clarified water or effluent (19) from the secondary clarifier (18) is preferably sent on to one or more tertiary treatment stages (24), which may include filtration, disinfection, or post-aeration or combination thereof, before discharge as final treated effluent (25).

A variety of waste solids handling and disposal operations may be used to treat the separated solids in the Waste Activated Sludge line (22). Typical post separation operations include gravity settling or thickening (26) to increase the solids content of the stream and reducing the total volume to be further treated. Thickened sludge (26) together with the particulate solids separated during primary treatment can then be treated in anaerobic or, more preferably oxygen enhanced aerobic biological reactors for digestion (27) to reduce the solids content of the waste sludge by converting solids into either methane or carbon dioxide gas. The remaining waste solids (28) typically undergo further dewatering (29) steps such as centrifugation or filtration to reduce the volume, forming a final waste solids stream (30) for final disposal. Final disposal can be a variety of operations, such as landfill, land application to farms as fertilizer, or incineration.

The present embodiment of the wastewater treatment system and method is characterized by high dissolved oxygen levels in the aeration basin, which produces a well-aerated biomass floc having superior settling characteristics and a reduced volume of excess sludge. Preferably, the dissolved oxygen levels in the aeration basin or activated sludge basin are in the euoxic range, or well-oxygenated range, which is typically found in healthy natural water bodies.

In addition, present embodiment of the wastewater treatment system and method is also characterized by an average sludge retention time in excess of 7 days, and more preferably in the range of between about 7 days to 40 days, and still more preferably in the range of between about 12 days to 30 days. The extended sludge retention times in conjunction with the higher levels of dissolved oxygen reduces the excess sludge yield. For comparison purposes with the prior art systems summarized in FIG. 1, the other salient characteristics of the present system and method include Food to Micro-organism ratio of 0.05 to 0.3 BOD/MLVSS, Dissolved Oxygen Level in the activated sludge basin of between about 5 to 15 mg per liter; Volumetric Loading of about 20 to 120 pounds of BOD per day per 1000 cubic feet; MLSS level in the activated sludge basin of between about 3000 and 10000 mg per liter; Hydraulic Retention Time of between about 2 to 12 hours and more preferably between 4 and 8 hours; and a Recycle Ratio of between about 0.25 to 0.75.

Figure 3:
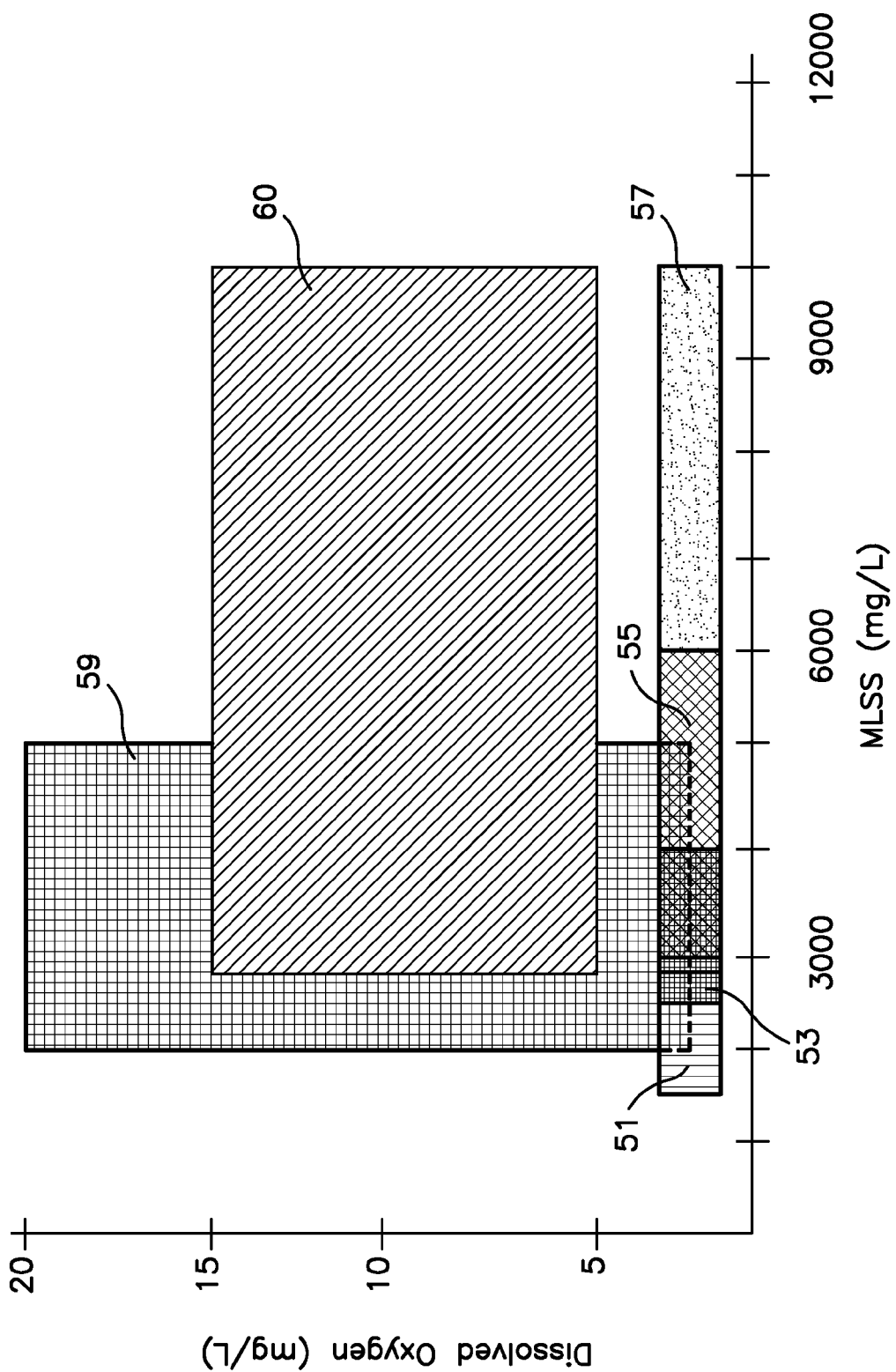
FIG. 3 is a chart that comparatively depicts selected operating characteristics of prior art wastewater treatment systems against the wastewater treatment process in accordance with the presently disclosed embodiments.
Figure 4:
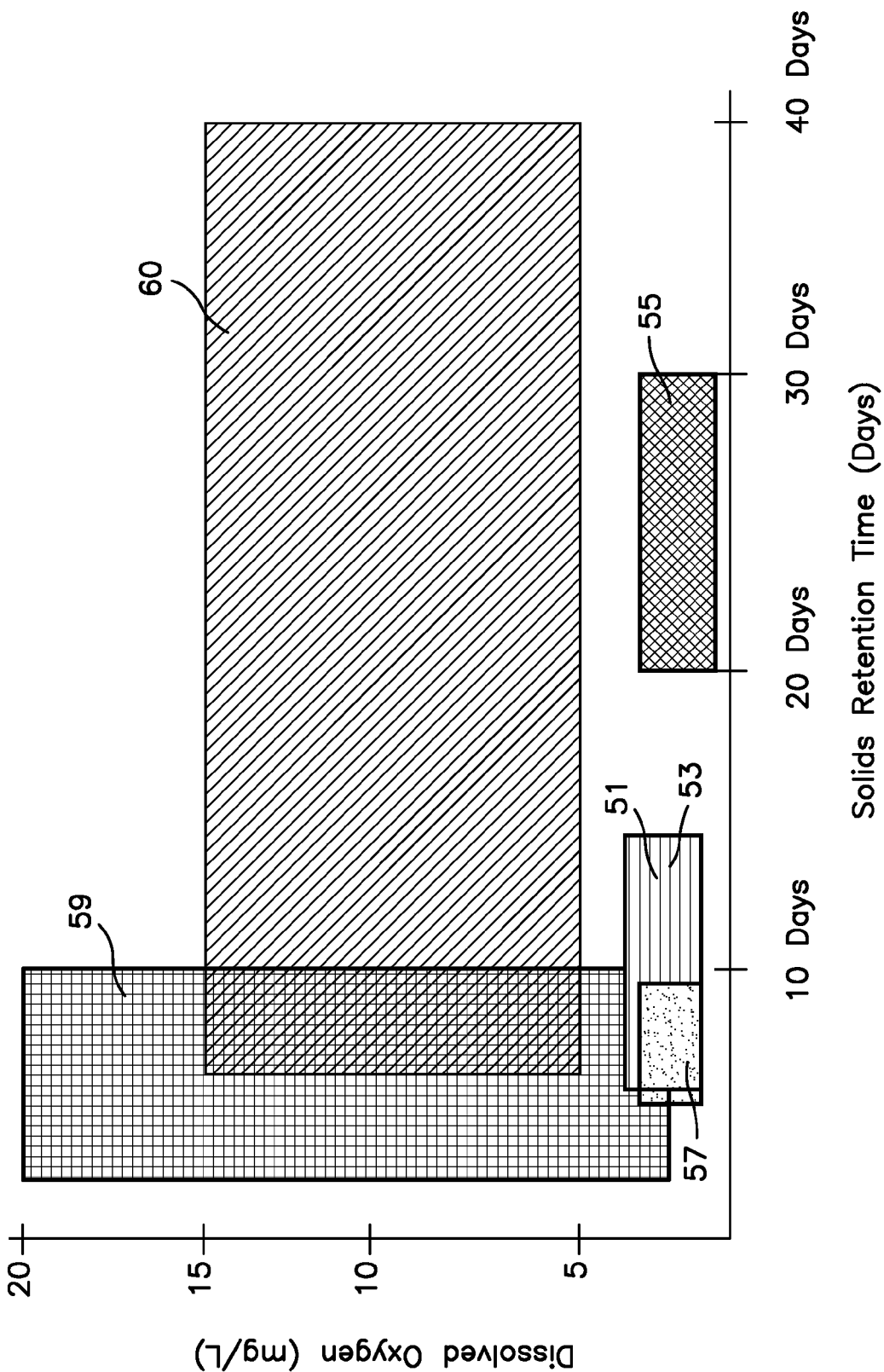
FIG. 4 is another chart that comparatively depicts selected operating characteristics of prior art wastewater treatment systems against the wastewater treatment process in accordance with the presently disclosed embodiments.

FIG. 3 comparatively depicts the dissolved oxygen level against the MLSS level of prior art wastewater treatment systems against the presently disclosed wastewater treatment process. Ranges of dissolved oxygen and MLSS are shown for conventional activated sludge process 51, complete mix activated sludge process 53, extended aeration and oxidation ditch activated sludge processes 55, therein, high rate aeration activated sludge process 57, covered basin high-purity oxygen activated sludge process 59, and the present high dissolved oxygen and high solids activated sludge process 60. Likewise, FIG. 4 depicts the dissolved oxygen level against the solids retention time of the same prior art wastewater treatment systems against the present high dissolved oxygen and high solids activated sludge process 60.

Dissolved Oxygen Levels

Conventional activated sludge processes typically maintain the dissolved oxygen level in the aeration basin in the range of 0.5-3.0 mg/L, with a dissolved oxygen level of about 2.0 mg/L under average conditions and a dissolved oxygen level of about 0.5 mg/L under peak load. It is commonly understood that in order to maintain aerobic conditions in the activated sludge floc a dissolved oxygen concentration between 0.2 mg/L and 1.5 mg/L, typically 0.5-0.7 mg/L, is desirable. At the lower organic loads of conventional activated sludge plants the rate of diffusion of organics into the floc is limiting as long as the dissolved oxygen level is maintained above a critical value, usually estimated as about 0.5 mg/L. In wastewater treatment systems where nitrification is desired, the dissolved oxygen concentrations in the activated sludge basin of about 0.5 mg/L to 2.5 mg/L are typically used with maximum dissolved oxygen levels ranging as high as 4.0 mg/L to allow a buffer for organic shock loads.

With the exception of selected covered basin high purity oxygen type wastewater treatment operations, the prior art activated sludge process based wastewater treatment systems emphasize the use of low dissolved oxygen levels and discourage operation of the wastewater plant at elevated levels of dissolved oxygen. Such elevated levels of dissolved oxygen are viewed as disadvantageous as such elevated levels of dissolved oxygen are believed to increase power and capital costs and otherwise contribute to performance problems. See, for example, prior art treatises "Design of Municipal Wastewater Treatment Plants", Water Environment Federation MOP 8 (1998); "Evaluation of Feasibility of Methods to Minimize Biomass Production from Biotreatment," H. David Stensel and Stuart E. Strand, (2004); and "Aeration: Principles and Practice," James A. Mueller, William C. Boyle and H. Johannes Pöpel, (2002).

In covered basin high purity oxygen wastewater treatment systems, the mixing of oxygen within the covered basin and the oxygen transfer efficiency therein are markedly different than the present system and method. Moreover, the headspace above the surface of the mixed liquor in a covered basin system typically has a carbon dioxide concentration between 2%-11% which is very much greater than the carbon dioxide concentration in a standard atmosphere above an open basin system. This excess carbon dioxide within the covered basin system leads to a build-up of carbonic acid in the mixed liquor, lowering pH of the mixed liquor and inhibiting certain types of microbial activity in the basin.

The present embodiment of the activated sludge process based wastewater treatment system preferably maintains the dissolved oxygen level at euoxic conditions, and more preferably at dissolved oxygen levels in the activated sludge basin or aeration basin of about 5 and 15 mg of oxygen per liter of mixed liquor.

Water bodies with reduced levels of dissolved oxygen, in the range of about 2.0 to 5.0 mg/L, are characterized as suffering from hypoxia which means "under oxygenated". Water bodies with levels of dissolved oxygen in the range of about 0.2 to 2.0 mg/L are characterized as severely hypoxic, and water bodies with dissolved oxygen levels below about 0.2 mg/L are termed anoxic which means "without oxygen". Conversely, water bodies with dissolved oxygen levels above the air saturation value or generally in excess of 9.0 mg/L at about 20° C., are termed hyperoxic or "over oxygenated". For purposes of this application, the term euoxic or "well oxygenated" shall refer to waters containing dissolved oxygen levels near saturation against atmospheric air. For wastewater treatment operations, euoxic conditions exist when the ratio of $(DO)/(DO_{sat})$ is between about 0.50 to about 1.50, and where DO is the 'Dissolved oxygen level measured in the aeration basin at temperature T'; and $DO_{sat}$ is the 'Dissolved oxygen level at saturation in atmospheric air at temperature T'.

With the foregoing in mind, the success of the activated sludge process depends on the functioning of organisms known as aerobic heterotrophs, particularly those which grow and thrive when freely suspended in the wastewater. Aerobic heterotrophs take complex organic molecules such as those responsible for the contamination of the wastewater, and convert these molecules either into cell mass or into carbon dioxide and water. These organisms are adapted to thrive in environmental conditions found in aqueous natural environments or euoxic conditions.

Dissolved oxygen levels which are lower than euoxic conditions likely cause stress to such aquatic organisms. Clearly, the dissolved oxygen levels normally employed in most conventional activated sludge basins (i.e. 0.5 mg/L to 2.0 mg/L) are severely hypoxic and very likely to cause stress and suboptimal performance of the desired aquatic organisms. The natural aquatic organisms responsible for the performance of the activated sludge process will likely operate in an optimum manner when the level of dissolved oxygen is maintained in the euoxic range. Maintaining the activated sludge basin or aeration basin in the euoxic range both optimizes the performance of the system for contaminant removal and in terms of the sludge settling properties. This preferred range of dissolved oxygen level in the aeration basin is between about 5.0 mg/L and about 15.0 mg/L to optimize performance of the aquatic organisms.

Activated sludge from aeration basins having a dissolved oxygen level above 5.0 mg/L tend to demonstrate or exhibit enhanced settling characteristics. The enhanced settling characteristics of the activated sludge, namely the three to five times increase in settling velocity, allow the present wastewater treatment process to operate at or near the maximum load capacity of the secondary clarifiers. Dissolved oxygen levels above 5.0 mg/L also freely allow the oxygen to fully penetrate the floc, making oxygen available for endogenous respiration of the micro-organisms even in the center of the floc. This has the effect of increasing the apparent endogenous decay coefficient, which allows for further reductions in excess sludge production.

In addition to improving sludge settling and reducing sludge yield, operating the aeration basin in euoxic conditions provides further benefits including: optimization of the growth and activity of nitrifiers, thus enhancing the conversion of ammonia to nitrate; and promotion of the growth and activity of higher life forms of micro-organisms, such as protozoa, which act as predators and consume additional excess sludge.

Contrary to conventional thinking, higher levels of dissolved oxygen in the aeration basin do not translate to significant increases power costs. Rather, maintaining the aeration basin at euoxic conditions is very practical and easily achieved in open basins with high purity oxygen aeration. The higher mass transfer rates of oxygen into liquid when using pure oxygen means that very little additional aeration energy is needed to increase the dissolved oxygen level from the conventional 1.0 mg/L to 2.0 mg/L using air to the present euoxic levels (i.e. 5.0 mg/L to 15.0 mg/L) using high purity oxygen. For example, to increase the dissolved oxygen level from 2.0 mg/L to 5.0 mg/L using with air and fine bubble diffusers requires about 83% increase in aeration power. The same increase of the dissolved oxygen level from 2.0 mg/L (using air) to the minimum 5.0 mg/L (using high purity oxygen) requires only about 8% more aeration power. As indicated above, a high purity oxygen aeration system is preferred as the dissolved oxygen levels approaching hyperoxic or high euoxic conditions (i.e. $DO/DO_{SAT}>1.0$) cannot be achieved with conventional air-based aeration systems, but are easily achieved with high purity oxygen aeration systems.

Solids Retention Time (SRT) and Mixed Liquor Suspended Solids (MLSS)

Solids Retention Time (SRT) is equivalent to the mean cell residence time in days of biological organisms in the activated sludge system and is commonly referred to as sludge age. SRT is one of the initial parameters specified for a wastewater process design, and is often chosen to provide adequate treatment of the wastewater or removal of the contaminants in the wastewater. The desired SRT level for a wastewater treatment operation is typically set at the minimum level needed to insure the desired removal of BOD, COD, and nitrogen.

It is well known in the art that operating an activated sludge basin with long sludge age or increased solids retention time results in a reduction in the yield of waste sludge. SRT levels may be increased by either increasing total aeration basin volume or by increasing the activated sludge basin mixed liquor suspended solids (MLSS) level. Increasing basin volume, however, increases the capital cost and land area required for the aeration basin, and may not be a practical solution for an existing wastewater plant or facility. Increasing MLSS level normally reduces the efficiency of conventional aeration systems, so that additional aeration equipment may be needed and associated power costs increase. Simply increasing MLSS levels also normally require increasing secondary clarifier capacity, which may require additional capital costs and more land area for the additional or larger secondary clarifiers. The presently disclosed system, on the other hand, overcomes these operating limitations and achieves extended SRT without increasing basin volume, without reduced aeration efficiency, and without additional clarifier capacity.

Most wastewater plants employing conventional or complete-mix activated sludge processes use an SRT of about 1 to 5 days for basins at warm temperatures and up to about 15 days for activated sludge basins at cold temperatures to insure complete nitrification. The present system and method, however, increases the SRT by increasing the MLSS level. In the present embodiment, the SRT is preferably greater than 7 days, and more preferably between about 7 days and 40 days, and still more preferably between about 12 days and 30 days. This increased SRT encourages the growth and maintenance of a more diverse population of aquatic micro-organisms in the activated sludge basin or aeration basin, particularly predatory organisms that consume heterotrophic bacteria, leading to further reductions in excess sludge and improved clarification of effluent through consumption of fine floc.

The range of MLSS employed in any particular application is determined by optimizing the solids loading to the existing clarifier, taking advantage of the enhanced settling characteristics achieved by elevated "euoxic" levels of dissolved oxygen as described above. MLSS in the range of 3,000 to 10,000 mg/L, more typically in the range of 5,000 to 8,000 mg/L, optimizes the existing clarifier loading in most applications under the enhanced or high dissolved oxygen conditions.

Additional System Performance Characteristics

Additional factors used in the design of activated sludge wastewater treatment systems include proper sizing and capacity of secondary clarifiers in view of the settling properties of the sludge. Settling properties of the sludge are often characterized by parameters known as sludge volume index (SVI) and the initial settling velocity (ISV) of the sludge to be processed. Lower values of SVI and higher values of ISV result in lower required clarifier areas, which translate to lower capital costs or increases in capacity for an existing clarifier. It has been recognized that settling characteristics of the sludge are affected by solids retention time, MLSS levels and dissolved oxygen levels within the activated sludge process as well as the type of biological reactor used in the activated sludge process. (See "Clarifier Design," Water Environment Federation Manual of Practice No. FD-8, (2006)).

As a result of the high solids retention time, high MLSS levels and high dissolved oxygen levels, the SVI and ISV of the presently described wastewater treatment system are improved over the prior art activated sludge process based wastewater treatment systems. Such improvements namely lower values of SVI and higher values of ISV and recycle sludge concentration result in enhanced settling characteristics. Table 1 below compares the likely range of SVI and ISV values of sludge processed in a conventional activated sludge process against the SVI and ISV values of sludge processed in the high dissolved oxygen and high solids system and method.

Figure 5:
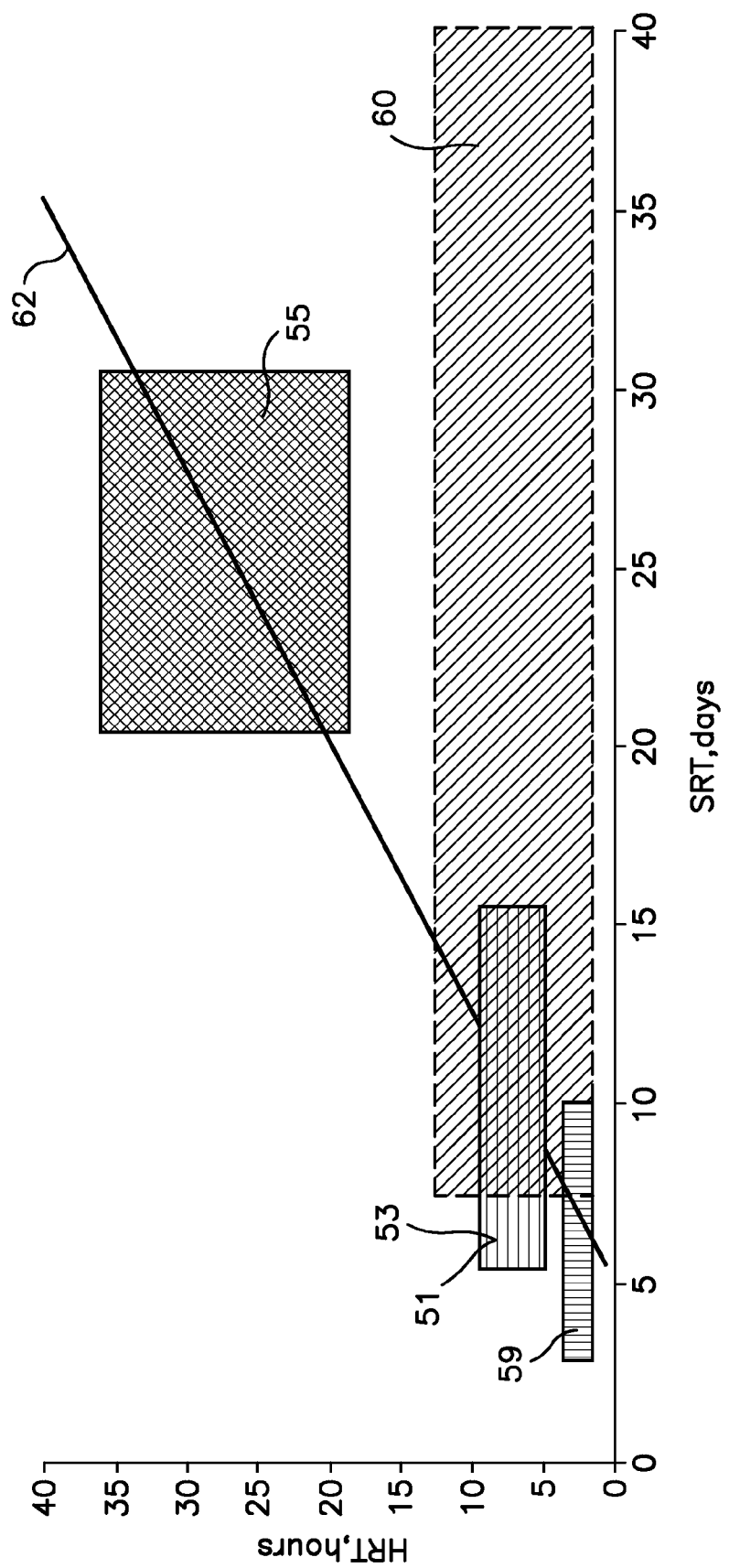
FIG. 5 is a chart that depicts solids retention time against hydraulic retention times for prior art wastewater treatment systems in comparison to the present wastewater treatment system and method.

The preferred embodiment of the High DO and High Solids activated sludge process calls for operation with an extended solids retention time in a range of about 12 to 30 days, while maintaining similar activated sludge basin Volumetric Loading as used in conventional activated sludge systems, namely a hydraulic residence time in the range of about 4 to 8 hours. As FIG. 5 graphically depicts, the prior art activated sludge processes such as Conventional/Complete-Mix, Covered Basin, and Extended Aeration form a common operating line (62) characterizing the relationship between hydraulic residence times and solids retention times. In contrast, the presently disclosed embodiments of the High DO and High Solids activated sludge process extends the system operation away from this typical operating line and toward much higher values of solids retention times for equivalent or comparable values of hydraulic residence times. Such distinctive operating characteristic is achieved by increasing MLSS levels without overloading clarifier capacity, though the mechanism of enhanced settling at high dissolved oxygen levels. As indicated above, the preferred range of hydraulic residence times is between about 2 to 12 hours and more preferably between 4 to 8 hours whereas the preferred range of solids retention times is between about 7 and 40 days and more preferably between about 12 and 30 days.

Figure 6:
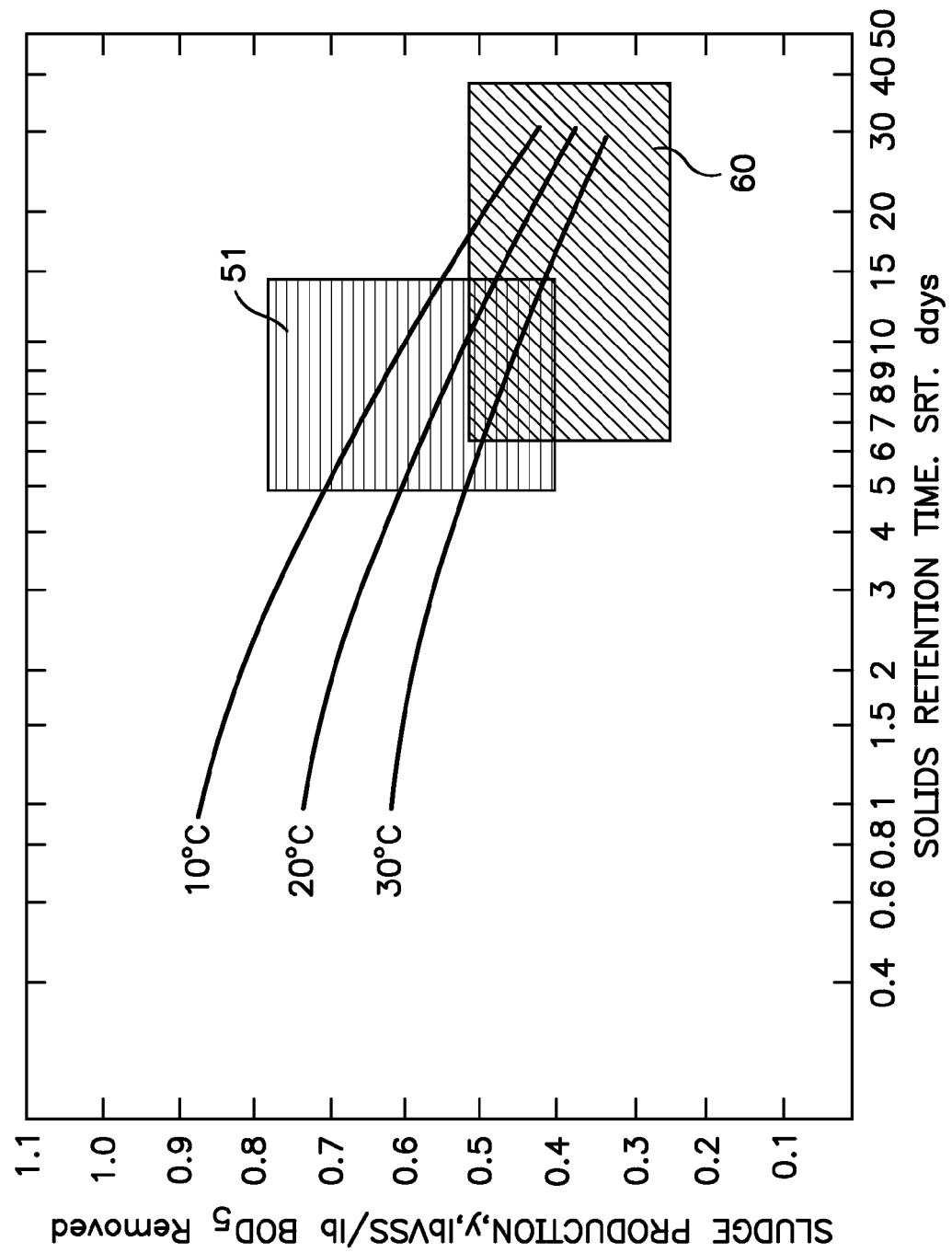
FIG. 6 is yet another chart that depicts solids retention time against excess sludge production for conventional activated sludge wastewater treatment systems in comparison to the present activated sludge wastewater treatment system and method.

Excess sludge production or $Y_{obs}$, is generally known to decline with increasing solids retention time as depicted in FIG. 6. However, long solids retention time traditionally required a high hydraulic residence times and/or a large basin volume. Using the presently disclosed embodiments of the High DO and High Solids activated sludge process, a better than expected observed sludge production ($Y_{obs}$) is achieved. Such enhanced sludge reduction capabilities is likely attributable to the synergistic effect of higher dissolved oxygen levels and high solids retention times and lower Food to Microorganism ratio employed by the present system than that employed by conventional activated sludge process. Each of these operating characteristics of the present system and method contribute to an overall lower waste sludge production than conventional activated sludge processes with a similar hydraulic residence time.

TABLE 1

Operating Characteristics of Activated Sludge Wastewater Treatment Processes

| Operating Characteristic | Conventional Activated Sludge Process | High DO & High Solids Activated Sludge Process |
|---|---|---|
| SVI | 100-150 | 30-70 |
| ISV (ft/hr) | ~1-3 | ~2-8 |
| F/M (kg BOD/kg MLVSS) | 0.2-0.6 | <0.1-0.3 |
| HRT (hours) | 4-8 | 2-12 |
| Recycle Concentration (%) | 0.5-1.5 | 1.5-3.0 |
| $Y_{obs}$, (g TSS/g BODr) | 0.5-1.0 | 0.3-0.7 |

Retrofit of Activated Sludge Wastewater Treatment Systems

The preferred procedure for implementing the present wastewater treatment system and method in existing air-based activated sludge wastewater plants invention includes the following steps:

Convert the air-based aeration system in the activated sludge basin from an air-based system, such as compressed air/fine bubble diffusers or mechanical surface aerators, to a high purity oxygen system, such as an I-SO, MVO, or Mixflo system available from Praxair, Inc. Operate the wastewater treatment plant with the high purity oxygen system at solids loading and dissolved oxygen levels used in the previous operating regime.

Gradually increase the level of dissolved oxygen in the activated sludge basin to the well-oxygenated or euoxic range, between about 5 mg/L to 15 mg/L or about 0.50-1.50 times the air saturation value. This increase in dissolved oxygen level improves the settling properties of the sludge in the secondary clarifier, allowing higher solids loading in the existing clarifier surface area.

Gradually increase in the MLSS level in the activated sludge basin. This is preferably accomplished through reduction of the waste activated sludge (WAS) rate and directing more sludge exiting the secondary clarifier to the return activated sludge line which recycles to the activated sludge basin thereby increasing the MLSS level in the activated sludge basin. Increasing the MLSS level also increases the solids retention time.

Continue to increase or maintain the dissolved oxygen level in the activated sludge basin at the euoxic conditions with the higher MLSS level. Also, continue increasing the MLSS level by controlling waste activated sludge rate and return activated sludge rate until the secondary clarifier solids-handling constraint is reached adhering, of course, to the appropriate safety margins. The secondary clarifier solids-handling constraint is preferably determined using existing sludge settling tests and clarifier analysis methods such as the commonly used state point analysis. With the higher dissolved oxygen conditions, it will be found that the secondary clarifier can handle a higher inlet MLSS concentration for the same volumetric flow.

As the sludge microbiology adjusts to the new operating conditions, continue monitoring and adjustment of MLSS level, sludge settling properties, and clarifier operating conditions, until steady operation is reached. The new preferred operating point will be characterized by higher dissolved oxygen levels in the range of between about 5 mg/L to 15 mg/L, extended solids retention time between about 7 days and 40 days, higher MLSS levels up to a maximum level of about 10000 mg/L in the activated sludge basin and reduced waste sludge production.

Monitoring of the MLSS levels as well as the dissolved oxygen level in the aeration basin are key parameters used in the automatic control of the present wastewater treatment system. Such automatic control preferably governs the oxygen supply or aeration system to match oxygen demand and maintain the dissolved oxygen level in the desired range at optimum costs. In addition, monitoring the sludge blanket level in the secondary clarifier and the total suspended solids level in the secondary effluent. Such monitoring and control preferably governs the operation of the secondary clarifier including control of the waste activated sludge rate and return activated sludge rate to maintain the MLSS levels in the activated sludge basin at the desire range.

High Purity Oxygen Aeration System

Figure 7:
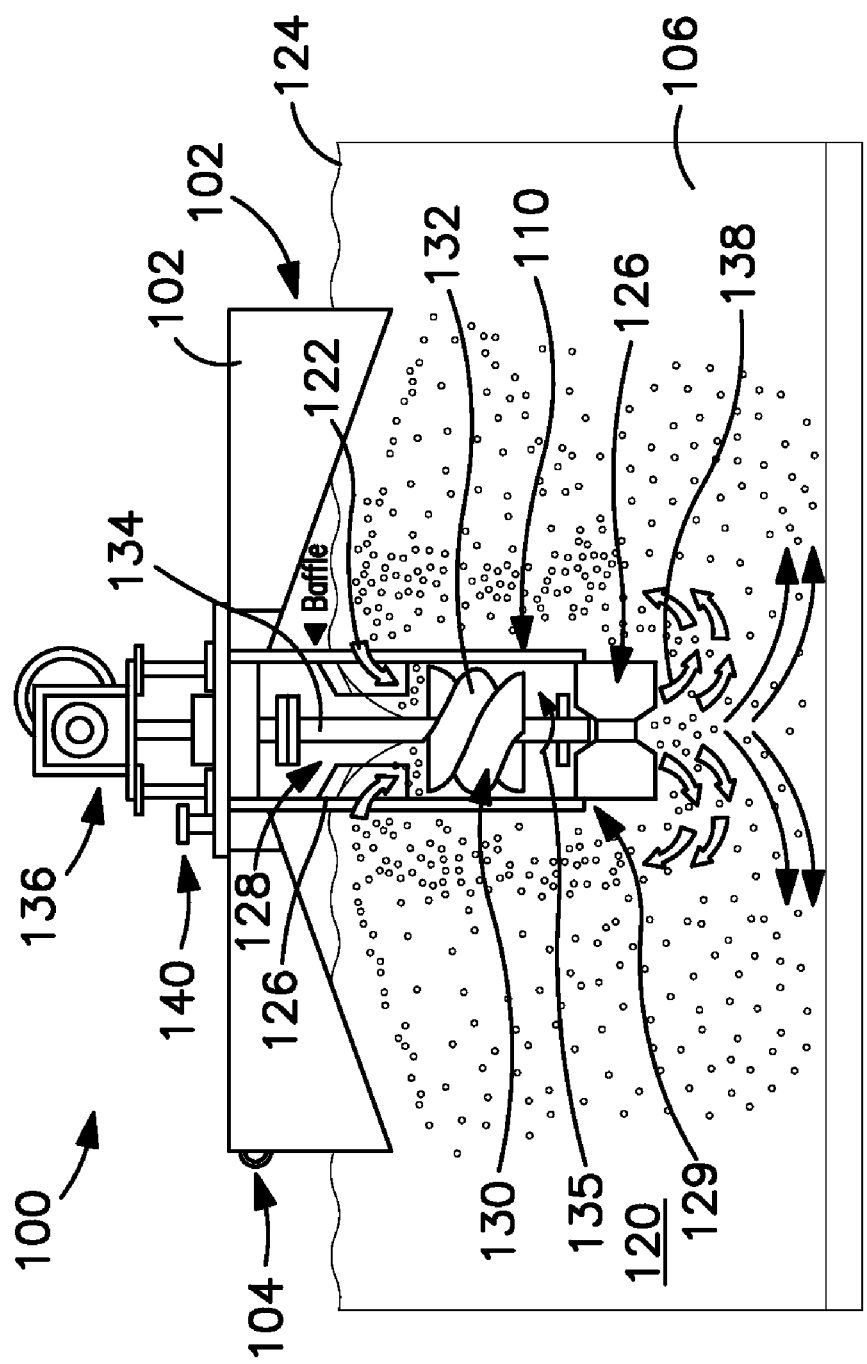
FIG. 7 is an illustration of the preferred embodiment of the high purity aeration system suitable for use with the present invention.

Turning now to FIG. 7, there is shown a high purity oxygen aeration system used in the present embodiment of the wastewater treatment system 100. As seen therein, the system includes a float assembly 102 having an anchor ring 104 which is placed in an activated sludge basin or aeration basin 106 of a wastewater treatment system 100. In the present application, the liquid within the aeration basin 106 is a high solid content mixed liquor 120, typically having a suspended solids content on the order of 3000 mg/L to 10000 mg/L. Extending in a downward orientation from the float assembly 102 is a draft tube 110. The draft tube 110 preferably has circumferential openings 122 located below the top surface 124 of the high-solids content mixed liquor 120 in the aeration basin 106. Baffles 126 are equilaterally spaced and symmetrically positioned around the openings 122 which are proximate to the entrance 128 to the draft tube 110. Additional baffles 126 can be located proximate the exit 129 of the draft tube 110. A helical impeller 130 is disposed within the draft tube 110 and generally comprises one or more blades 132 that are affixed to the impeller shaft 134 for rotation with the impeller shaft 134 by motor 136, which is preferably placed on top of the float assembly 102.

The motor is adapted to drive the impeller shaft 134 and in turn move the liquid and gas within the draft tube 110 in a downward direction of arrow 138. The oxygen gas is preferably introduced through the gas inlet 140 which discharges the oxygen gas proximate the entrance 128 of the draft tube 110. Recirculation of the high solids content mixed liquor 120 occurs as a result of a mechanical agitation within the draft tube 110 and the corresponding downward force of the high solids content mixed liquor 120 in the draft tube 110. As the mixed liquor with gas bubbles is ejected from the exit 129 of the draft tube 110, a suitable volume of replacement mixed liquor 120 having some mass of dissolved oxygen is ingested through openings 122 near the entrance 128 of draft tube 110.

The impeller 130 defines a radial clearance between the tip of the impeller blade and the interior wall of draft tube 110. Preferably, the radial clearance is less than or equal to one-half the impeller diameter and more preferably the radial clearance will be less than 10% of the impeller diameter. When used with high-solids content mixed liquor of a wastewater treatment application, the close arrangement of the impeller 130 with the interior wall of the draft tube 110 or other hydrodynamic structure tends to impart higher shear forces to achieve the optimal oxygen bubble size distribution, namely about 0.3 mm to 3.0 mm. This optimized bubble size distribution of the oxygen gas within the high solids content mixed liquor enhances the mass transfer efficiency of the aeration process ultimately resulting in higher levels of dissolved oxygen.

A more detailed discussion of the preferred high purity oxygen aeration system and the reasons for its effectiveness are set forth in U.S. patent application Ser. No. 11/602,519 filed Nov. 21, 2006, the disclosure of which is hereby incorporated by reference.

In view of the fact that the present system and method employs a source of oxygen for use with the high purity oxygen aeration system, it is further contemplated to combine the present system and method with related technologies involving oxygen including: ozonation of sludge in the return activated sludge line or similar secondary application of ozone; oxygenation of the high viscous materials in an aerobic digestor. Similarly, since the present system and method further contemplate the active control of oxygen within the wastewater treatment plant, it is equally contemplated to integrate the present system and method with related technologies involving de-nitrification in the activated sludge basin or separate de-nitrification basins. One such proposed method would be to cycle the dissolved oxygen level in the activated sludge basin between euoxic conditions in range of between about 5 mg to 15 mg of oxygen per liter of mixed liquor and anoxic conditions in range of between about 0.0 mg to 0.2 mg of oxygen per liter of mixed liquor. In such contemplated embodiment, the anoxic conditions are suitable for de-nitrification purposes whereas the euoxic conditions are more suitable for reduced sludge production and system operating efficiency, as described herein.

Further contemplated arrangements of introducing oxygen into the activated sludge basin involve segregating the basin into a plurality of sections. Conventional air-based aeration is incorporated in one or more sections of the basin to keep the dissolved oxygen level at moderate levels in such sections while high purity oxygen aeration is incorporated in selected sections of the basin. Such staged basin approach may reduce the overall system operating cost but still achieves the high MLSS levels to achieve longer solids retention time and reduced waste sludge, as in the preferred embodiments, described above.

Such multiple stage basin or multiple section basin could also be used where the mixed liquor in one or more sections are maintained in anoxic conditions to facilitate de-nitrification processes, or in anaerobic conditions for biological phosphorus removal, while euoxic conditions are maintained in other sections to reduced overall sludge production and improve the system operating efficiency and costs.

INDUSTRIAL APPLICABILITY

The presently disclosed system and method minimizes the operating cost of the activated sludge process in wastewater treatment while enhancing system productivity and avoiding capital costs associated with expansion of basin area and/or clarifier capacity. Prior art open-basin wastewater treatment systems and processes focus only on minimizing aeration power cost through close control of the dissolved oxygen levels at the minimum levels necessary to maintain aerobic conditions (i.e. 0.5 mg/L to 3.0 mg/L). Although operating costs associated with handling and disposal of waste sludge are similar in magnitude to aeration costs, surprisingly process optimization has not been fully exploited to minimize the sum of aeration and sludge processing costs.

In addition, the use of ability of high purity oxygen aeration systems to maintain relatively low aeration costs is recognized, but the use of high purity oxygen aeration systems in selected operating conditions of an open basin activated sludge treatment in order to lower excess sludge yield and corresponding sludge disposal costs has not heretofore been fully utilized.

Such optimization of process conditions using high levels of dissolved oxygen and high solids retention times for total cost minimization and exploitation of the influence of high purity oxygen aeration systems on process operation yields numerous benefits and commercial advantages. Such benefits and commercial advantages may include: (i) improved settling characteristics of sludge when the aeration basin is operated at elevated levels of dissolved oxygen; (ii) reasonably low power costs to achieve elevated levels of dissolved oxygen using high purity oxygen aeration systems; (iii) reduced sludge handling and disposal costs as a result of reduced excess sludge production; (iv) increase plant treatment capacity per unit volume of aeration basin; (v) minimal capital investment due to smaller basin requirements, no need for membrane separation, and ability to easily retrofit existing wastewater treatment operations; (vi) reduced need to re-aerate or post-aerate the effluent as the effluent of the present system and method is already euoxic or well oxygenated; (vii) increased capability for nitrification due to higher solids retention time; (viii) increased capability for removal of complex organic contaminants due to higher solids retention time; and (ix) increased stability to shock loads.

From the foregoing, it should be appreciated that the present invention thus provides a system and method for the activated sludge treatment of wastewater using high levels of dissolved oxygen together with high sludge retention times and/or high solids content in the aeration basin or activated sludge basin. While the invention herein disclosed has been described by means of specific embodiments and processes associated therewith, numerous modifications and variations can be made thereto by those skilled in the art without departing from the scope of the invention as set forth in the claims or sacrificing all its material advantages.

What is claimed is:

1. A method of treating wastewater comprising the steps of:
receiving a stream of wastewater into a mixed liquor in an uncovered activated sludge basin;
introducing oxygen to the mixed liquor in the uncovered activated sludge basin to produce euoxic conditions in the uncovered activated sludge basin;
passing a portion of the mixed liquor in the uncovered activated sludge basin through a separator to separate activated sludge and produce an effluent stream and an activated sludge stream; and
recycling a portion of the activated sludge stream to the uncovered activated sludge basin to produce a mixed liquor having a solids loading of between about 3000 mg and about 10000 mg of suspended solids per liter of mixed liquor.

2. The method of claim 1 wherein the step of introducing oxygen to the mixed liquor in the uncovered activated sludge basin further comprises introducing oxygen to produce a mixed liquor having an average dissolved oxygen level in the range of between about 5 mg to 15 mg of oxygen per liter of mixed liquor.

3. The method of claim 2 wherein the step of removing a portion of the mixed liquor in the uncovered activated sludge basin through a separator further comprises removing a portion of the mixed liquor to a clarifier and separating sludge from the mixed liquor in the clarifier to produce an effluent stream and an activated sludge stream.

4. The method of claim 1 wherein the step of recycling a portion of the activated sludge stream to the uncovered activated sludge basin further produces a mixed liquor having a solids retention time of between about 7 days and about 40 days.

5. The method of claim 1 wherein the average hydraulic residence time is between about 2 hours to about 12 hours.

6. The method of claim 5 wherein the observed sludge yield is between about 0.3 grams to 0.7 grams of total suspended solids per gram of BOD removed.

7. The system of claim 3 wherein the settling properties of the sludge separated from the mixed liquor in the clarifier are characterized by a sludge volume index of between about 30 to 70.

8. The system of claim 3 wherein the sludge separated from the mixed liquor in the clarifier has an initial settling velocity of greater than about 3 feet per hour.

9. The method of claim 1 wherein the uncovered activated sludge basin comprises a plurality of uncovered sections and the step of introducing oxygen further comprises introducing air into one or more of the uncovered basin sections and introducing high purity oxygen into one or more of the basin sections.

10. The method of claim 1 wherein the uncovered activated sludge basin comprises a plurality of uncovered sections and the step of introducing oxygen further comprises introducing high purity oxygen into less than all of the uncovered basin sections.

11. The method of claim 1 further comprising the step of ozonating a portion of the recycled sludge.

12. The method of claim 1 further comprising the steps of:
separating solids from the stream of wastewater in a primary clarifier prior to receiving the stream in the uncovered activated sludge basin;
receiving the separated solids and a portion of the separated activated sludge in an aerobic digestor; and
oxygenating the separated solids and separated activated sludge in the aerobic digestor.

13. The method of claim 1 wherein the step of introducing oxygen to the mixed liquor in the uncovered activated sludge basin further comprises:
introducing oxygen gas proximate the entrance of a draft tube and impeller assembly submersed in the mixed liquor in the uncovered activated sludge basin;
agitating the mixed liquor and oxygen within the draft tube to dissolve a portion of the oxygen gas into the mixed liquor within the draft tube and create undissolved oxygen bubbles having an average diameter of between about 0.3 mm and 2.0 mm within the draft tube; and
discharging the oxygenated mixed liquor and undissolved gas bubbles into the uncovered activated sludge basin.

14. A method of treating wastewater comprising the steps of:
receiving a stream of wastewater into a mixed liquor in an uncovered activated sludge basin;

introducing oxygen to the mixed liquor in the uncovered activated sludge basin to produce euoxic conditions in the uncovered activated sludge basin;

removing a portion of the mixed liquor to a clarifier and separating sludge from the mixed liquor in the clarifier to produce an effluent stream and an activated sludge stream; and recycling a portion of the activated sludge stream to the uncovered activated sludge basin to produce a mixed liquor having a solids retention time of between about 7 days to about 40 days.

15. The method of claim 14 wherein the step of introducing oxygen to the mixed liquor in the uncovered activated sludge basin further comprises introducing oxygen to produce a mixed liquor having an average dissolved oxygen level in the range of between about 5 mg to 15 mg of oxygen per liter of mixed liquor.

16. The method of claim 14 wherein the step of recycling a portion of the activated sludge stream to the uncovered activated sludge basin further produces a mixed liquor having a solids loading of between about 3000 mg and about 10000 mg of suspended solids per liter of mixed liquor.

17. The method of claim 14 wherein the average hydraulic residence time is between about 2 hours to about 12 hours.

18. The method of claim 17 wherein the observed sludge yield is between about 0.3 grams to 0.7 grams of total suspended solids per gram of BOD removed.

19. The method of claim 14 further comprising the step of ozonating a portion of the recycled sludge.

20. The method of claim 14 further comprising the steps of:
separating solids from the stream of wastewater in a primary clarifier prior to receiving the stream in the uncovered activated sludge basin;

receiving the separated solids and a portion of the separated activated sludge in an aerobic digestor; and oxygenating the separated solids and separated activated sludge in the aerobic digestor.

21. The method of claim 14 wherein the step of introducing oxygen to the mixed liquor in the uncovered activated sludge basin further comprises:
introducing oxygen gas proximate the entrance of a draft tube and impeller assembly submersed in the mixed liquor in the uncovered activated sludge basin;

agitating the mixed liquor and oxygen within the draft tube to dissolve a portion of the oxygen gas into the mixed liquor within the draft tube and create undissolved oxygen bubbles having an average diameter of between about 0.3 mm and 2.0 mm within the draft tube; and discharging the oxygenated mixed liquor and undissolved gas bubbles into the uncovered activated sludge basin.

22. A method of enhancing wastewater treatment operations comprising the steps of:
introducing supplemental oxygen to an uncovered activated sludge basin to produce a dissolved oxygen level in the range of between about 5 mg to 15 mg of oxygen per liter of mixed liquor; and recycling activated sludge to the uncovered activated sludge basin to produce a solids loading of between about 3000 mg and about 10000 mg of suspended solids per liter of mixed liquor.

23. A method of enhancing wastewater treatment operations comprising the steps of:
introducing supplemental oxygen to an uncovered activated sludge basin to produce a dissolved oxygen level in the range of between about 5 mg to 15 mg of oxygen per liter of mixed liquor; and recycling activated sludge to the uncovered activated sludge basin to maintain a solids retention time of between about 7 days to about 40 days.

* * * * *